United States Patent Office 3,227,667
Patented Jan. 4, 1966

3,227,667
LIGNIN, PHENOL, AND ALDEHYDE CONDENSATION PROCESS AND PRODUCT
William R. Moffitt, Stamford, Conn., and Morris B. Berkey, Seattle, Wash., assignors to The Borden Company, New York, N.Y., a corporation of New Jersey
No Drawing. Filed Sept. 21, 1960, Ser. No. 57,396
8 Claims. (Cl. 260—17.5)

This invention relates to condensation products of lignin, a phenol and an aldehyde.

The invention is particularly useful in making resinous products suitable for such uses as the adhesive in bonding wood veneers into plywood and will be illustrated by description in connection with such use.

The lignin content of the more common woods being processed in this country averages about a fourth of the weight of the wood. In spite of the evident importance of the subject and the number of researches and publications on the utilization of lignin, it remains largely a waste or very low priced product.

In the attempted use of phenol and formaldehyde condensation products containing a lignin moiety, in the plywood industry, for instance, problems have arisen because of the short pot life or period after the glue is compounded that it remains in condition for use, exceptional penetration and attendant disappearance of the glue mix below the surface of the wood to be bonded, or unsatisfactory bonding together of the wood surfaces.

This invention provides an adhesive that avoids these difficulties and is lower in cost of production than competitive adhesives such as the glues based primarily on phenol and formaldehyde condensates.

Briefly stated, the invention comprises the process of and the product resulting from making an alkali soluble and water insoluble condensate of lignin, a phenol, and an aldehyde in an aqueous alkaline medium. In the preferred embodiment, the invention includes effecting the initial condensation of the lignin and phenol in an acid medium until a first stage water soluble condensate results, then admixing the aldehyde and alkali in amount to neutralize the acid and establish alkalinity of the mixture, and continuing the condensation in the alkaline medium until a condensation product results that is insoluble in water and soluble in the aqueous alkaline medium.

The lignin used is that from any of the common American woods as, for example, Douglas fir, white pine, white or red spruce, cedar or hemlock.

When the lignin used is that extracted from Douglas fir bark, the wax found in this lignin suitably is extracted with an organic solvent for the wax, before the lignin is processed with the phenol and formaldehyde.

Particularly satisfactory results have been obtained when the lignin used is that dissolved from wood chips, sawdust or other form of comminuted wood by an acidic acetone extraction process. An example of such extraction is the following: Fine wood chips are maintained in contact with a solution including 25–95 parts of acetone, 0.5–5 parts of 37% hydrochloric acid and sufficient water to make 100 parts total, under extracting conditions and at a temperature within the approximate range 100°–140° C. and under pressure, until a satisfactory yield of the lignin has been extracted from the wood, as, for instance, with repeated replacement of the extract with fresh acidic acetone solution for a period of 4–10 hours. The extract or combined extracts are filtered and then subjected to evaporation as by distillation at temperature not above 110° C. so that the part of the acetone which is not chemically combined with the lignin distills away. The proportion of water to acetone in the remaining still residue gradually increases as the distillation proceeds until the lignin flakes out in solid form in the still. These flakes may be used as such or may be dewatered, as by filtration and further drying.

The acidified-acetone extractable material, i.e., the lignin so made is thermosetting and highly reactive with phenol and phenol and formaldehyde mixture, in each case with a catalyst.

In place of the hydrochloric as the acid in this separation of lignin from the wood, we may use sulfuric, sulfurous, phosphoric acid, or other acid.

For purposes for which the wax of the selected wood has an objectionable effect of the use of lignin, the lignin selected is washed (extracted) with a solvent for the wax which is a non-solvent, this term including a poor solvent, for the lignin as, for instance, pentane, hexane, cleaner's naphtha, or other volatile hydrocarbon liquid. The extraction is continued to advantage until the lignin becomes substantially free from the wax, benefit from the wax removal increasing with the thoroughness of the extraction.

The phenol to be used in conjunction with the lignin is ordinarily the phenol $C_6H_5OH$. While homologs and analogs such as commercial m- and p-cresol or resorcinol may be used for special purposes, they are not recommended generally in the process or product of the invention.

The aldehyde selected for the condensation is ordinarily formaldehyde in any of its commercial forms including, for example, the paraformaldehyde or the 37% aqueous solution, furfural, or formaldehyde and furfural jointly. No advantage has been found in the substitution of other aldehydes such as acetaldehyde or butyraldehyde.

The acid catalyst of condensation of the lignin with phenol and with formaldehyde is any one of the acids commonly used as the catalyst in the condensation of phenol with formaldehyde. Examples are hydrochloric, sulfuric or oxalic acid, the first two being more satisfactory, convenient, and economical.

For the second or final stage of the condensation in which an alkali catalyst is used, the alkali is ordinarily one of the alkali metal alkalies, i.e., the hydroxides or carbonates, sodium and potassium hydroxides being particularly effective and being recommended.

Permissible proportions of the various materials and also a range that is recommended for commercial use are shown in the following table. In this table and elsewhere herein proportions are expressed as parts by weight except where stated specifically to the contrary.

| Component | Parts by Weight | |
|---|---|---|
| | Permissible | For best Results |
| Lignin | 100 | 100 |
| Phenol | 40–150 | 50–100 |
| Aldehyde | See below | See below |
| Acid for the initial condensation to establish pH of about | 0.1–5 | 1–4 |
| Alkali for the final condensation to establish the pH | above 10 | 13–14 |

The aldehyde used in the condensation is about 1.5–2.5 moles for each mole of phenol, i.e., about 47–80 parts by weight for 100 of phenol $C_6H_5OH$ and about 25–45 parts for each 100 of the lignin. This corresponds in a typical run to about 35–70 parts of formaldehyde on the dry basis and ordinarily 45–65 parts for 100 of the mixed phenol and lignin.

We convert the lignin-phenol-aldehyde condensation product to a commercial glue by incorporating usual glue compounding ingredients such as filler, water, and sometimes also a thickener and additional alkali metal alkali.

Fillers that may be used include wood flour; the dried insoluble solid residue from the sulfuric acid hydrolysis of cereal wastes, such as oat hulls, a representative of such residue being known as Furafil; the dried and ground fraction of Douglas fir bark known as Silvacon 472; and Glufil, walnut shell flour. The fillers are used in the proportion of about 20–150 parts and ordinarily 75–100 for 100 of lignin used.

The thickeners that may be used are chemically inert viscosity builders. They include the water dispersible vegetable gums used heretofore to thicken aqueous adhesives, such as the galactan-containing gums, e.g., locust bean, karaya and guar gums. The proportion of the gum is suitably within the range 0.5–1.5 for 100 parts of the lignin in the glue. In place of the gum, we may use Polyox, a polymer of ethylene oxide of viscosity in water at 25° C. within the range 225 cps. for a 5% solution up to 4000 cps. for a 1% solution, this polymer being used in the proportion of about 0.03–1.5 parts for 100 of the lignin.

As to the conditions of condensation, the lignin and phenol for best results are first reacted in contact with the selected one of the acids. The acid may vary widely in proportion, as in amount to establish the pH within the range 0.1–5 or to correspond to about 0.1%–1% of the total mix at this stage. The reaction is continued until condensation has been effected as shown by the lignin dissolving in the aqueous mixture. The whole is then alkalized, as with sodium hydroxide, in quantity to raise the pH above 7, cause a satisfactory rate of condensation of the lignin-phenol-aldehyde composition and to dissolve the final ternary condensation product. This will require a pH of about 10–14 and suitably alkalinity equivalent to that produced by about 5–40 parts of sodium hydroxide for 100 of lignin used, in addition to the small amount required to neutralize the acid catalyst first used. The condensation is then completed.

Both the acid and alkali condensations are accelerated by warming, as to 60°–110° C.

The alkali condensation is continued until the resulting condensation product is soluble in the sodium hydroxide solution present in the reaction but insoluble in water, as shown by adding acid to a test sample to establish the pH at 7, and until the viscosity of the product, as measured at 20° C. in an aqueous solution of solids content approximately 48%, is approximately within the range 200–1000 cps. and for most satisfactory use about 250–500 cps.

For some uses of the product, the lignin may be introduced into the phenol and aldehyde condensate at the glue mixing stage and the whole is then warmed, as for 20–60 minutes at about 60°–100° C. in contact with alkali in the proportion stated, to react the lignin with the said condensate so as to form the ternary condensate.

In making the finished glue, the lignin-phenol-aldehyde condensate in aqueous alkali solution is mixed with the various admixtures heretofore described, such as the fillers, thickeners, and additional alkali before the composition is used as a glue.

Glue mixtures made as described have good pot life. They are useful for application to surfaces to be bonded for substantial periods as up to 2–6 weeks or more after they are compounded. They are thickened by reaction in contact with the alkali to such an extent that excessive penetration below wooden surfaces to be bonded is prevented. Finally, they give good bonding of wood to which applied as in plywood manufacture.

The invention will be further illustrated by description in connection with the following specific examples of the practice of it. In all these the proportions of the components are stated as parts by weight on the dry basis unless specifically stated to the contrary.

EXAMPLE 1

The formaldehyde here used corresponds to 1.5 gram moles for 94 grams total weight of the phenol and lignin, which may be allocated as about 2 moles of the formaldehyde to 1 mole of phenol and 32 parts by weight for 100 parts of the lignin.

The lignin used was prepared by the acid-aqueous acetone extraction of Douglas fir chips of size normally charged to digestions for paper making as described, followed by the evaporation of acetone and water from the extract. The lignin at no time during the preparation was exposed to a temperature substantially above 140° C.

The lignin was then mixed in the proportion of 12.7 parts by weight with 12.7 of U.S.P. phenol, 9.42 of water, and 0.09 of 20° Bé. hydrochloric acid solution. The mixture was heated to reflux and maintained at approximately 100° C. for one hour and then cooled to 70° C. At this time the lignin had combined with the phenol and was in solution. 32.9 parts of 37% aqueous formaldehyde solution and 2.54 parts of 50% sodium hydroxide solution were then introduced gradually and stirred in. The resulting mixture was warmed and maintained at 85° C. until the mixture thickened to a viscosity of 550 cps. (All viscosities reported herein are measured at 21° C.) Then there was introduced 12.7 parts of 50% sodium hydroxide solution and 16.95 parts of additional water to make 100 parts by weight of the total mixed charge. The whole was then warmed at 90° C. until a viscosity of 320–400 cps. was obtained. The product was then cooled to about 21° C. The solids content of the product is calculated at 38.9%.

The finished glue mix was made of the following formula.

Glue components: Parts
Water _____ 36
50% sodium hydroxide solution _____ 8
Sodium carbonate (soda ash) _____ 5
The above was mixed for 2 minutes.
Silvacon 472 _____ 20
 Heated 20 minutes at 180° F.–200° F. Then cooled to 70° C.
Aqueous solution of the above lignin-phenol-formaldehyde condensation product _____ 100
 Mixed 5 minutes.

The glue so made was applied at the rate of 47 pounds per 1000 square feet of double glue line on the center and three wood veneers to be bonded of thickness ⅛, 3/16, and ⅛ inch respectively. They were assembled and hot pressed to give a finished plywood panel of overall thickness approximately 7/16 inch. This assembly was made in various tests in 5, 10, 20 and 30 minutes and hot pressed, two panels per press opening at 175 p.s.i. for the varying times stated at 300° F.

When the specimens had been cooled and then were pulled apart, in the shear test, the specimens hot pressed for 9.5 minutes showed wood failures of 90%–95%. This means that only 5%–10% of the breaks occurred in the glue. Averages of the failure in the wood for the four specimens pressed for 9.5 minutes were 93%, failures for two groups totaling eight specimens pressed half for 7.5 minutes and the other half for 8.5 minutes averaged 77%.

This comparative test shows our more economical lignin, phenol and formaldehyde condensation product, particularly at 9.5 minutes press time, to be satisfactory in this highly developed and efficient industry in which cost lowering is now difficult to achieve but still important.

EXAMPLE 2

Included for comparison is a comparable test in which the lignin was introduced only at the glue compounding stage. The proportion of formaldehyde here used corresponds to approximately 80 parts for 100 parts of the phenol and 29 parts for 100 parts of the lignin. A condensate solution (A) was first made as follows:

The phenol 16.55 parts, water 2.49, and formaldehyde 62.77 parts of 37% solution were mixed together and then 18.19 parts sodium hydroxide solution were introduced slowly, with cooling to 40° C., over a period of 8 hours. The whole was then cooled to approximately 20° C. and compounded with the glue making components in the proportions that are shown below for 60 parts of the condensate solution or for 9.93 parts of phenol used.

| Glue components: | Parts |
|---|---|
| Water | 40 |
| Lignin | 20 |
| Douglas fir bark powder | 15 |
| Locust bean gum-mixed 5 minutes | 0.25 |
| Condensate solution (A), no lignin | 60 |
| 50% sodium hydroxide solution | 8 |
| Soda ash, heated 5 minutes at 180° F. | 5 |

The phenol used corresponds to approximately 50 parts for 100 of lignin.

When this product so compounded was tested in the wood bonding and breaking test described, the percentage of wood failure in three specimens tested was 94% when the hot press time was 9.5 minutes. For 8 and 8.5 minute hot press times, however, 8 specimens averaged 69% wood failure.

EXAMPLE 3

The formaldehyde here used was 64 parts for 100 parts total weight of the lignin and phenol, corresponding to about 2.67 moles of formaldehyde to 1 mole of the phenol and 42 parts for 100 of lignin.

15.11 parts of the lignin of kind described in Example 1, 15.11 parts of U.S.P. phenol, 2.24 parts of water and 0.25 of concentrated sulfuric acid were heated to reflux and held at 100°–105° C. for 30 minutes. The batch was then cooled to 60° C. and there were added 52.17 parts of 37% formaldehyde solution and 9.03 of 50% sodium hydroxide solution. The mix was held at 60° C. until the viscosity became 290 cps. There were then introduced 6.09 cc. of additional 50% sodium hydroxide solution and the temperature was maintained at 50° C. until a viscosity of 750 cps. was reached for the solution of solids content approximately 48%, the viscosity being measured as usual after the solution had been cooled to 21° C.

The resulting solution of the lignin, phenol and formaldehyde condensate was then compounded with the glue additives of kind and in proportion for 100 parts of the condensate solution as stated in Example 1.

The breaking tests of plywood assemblies bonded with the adhesive, for 4 specimens hot pressed for 9.5 minutes, showed wood failures averaging somewhat lower than in Example 1. These less favorable results are attributed to a formaldehyde ratio above the most satisfactory range.

The slow reaction at low temperature for a longer time, i.e. 60° C. for 6 hours, in making the condensation product, on the other hand is considered a factor in this glue's having a storage life of 6 weeks.

EXAMPLE 4

The condensate was made as follows.

| Component: (1) | Parts |
|---|---|
| Lignin | 15.11 |
| U.S.P. phenol | 15.11 |
| Water | 2.24 |
| (2) | |
| Conc. sulfuric acid | .25 |
| 37% formaldehyde solution | 52.17 |
| (3) | |
| 50% caustic soda | 9.03 |
| (4) | |
| 50% caustic soda | 6.09 |
| Total | 100.00 |

*Procedure*

Charge (1). Heat to reflux. Hold at 100°–105° C. for 30 minutes. Cool to 60° C. and add (2) and (3). Hold at 60° C. until a viscosity of 290 cps. results. Charge (4) and maintain temperature of 60° C. until the viscosity is 750 cps. Cool below 30° C. Solids: 48.4%.

The total formaldehyde and furfural used may be allocated at about 2.5 moles for each mole of phenol and 45 parts for each 100 parts of the lignin and phenol.

The condensate solution was compounded with the glue additives as in Example 1 and then used to bond wood veneers. The bonded products, when tested as described, showed 89% wood failure as the average for 4 specimens that had been hot pressed for 9.5 minutes and 90% for 4 specimens hot pressed 8.5 minutes.

EXAMPLE 5

The procedure and composition of Example 1 were used except that the lignin was first treated to remove wax, by being stirred with three successive portions of hexane, each of weight about three times that of the lignin, settled and the supernatant liquid decanted. After the last treatment with the hexane, the settled lignin was filtered and the filter cake dried at about 80° C.

The dried product was a substantially wax free and hexane free lignin.

The use of the wax free lignin decreased the gelation tendency of the final glue mix, without destroying the bonding power of the glue.

EXAMPLE 6

The procedure and composition of any of the Examples 1–4 are used except that the phenol there used is replaced in turn by an equivalent weight as a phenol of commercial cresol.

It will be understood that it is intended to cover all changes and modifications of the examples of the invention herein chosen for the purpose of illustration which do not constitute departure from the spirit and scope of the invention.

We claim:

1. In making a lignin, phenol and aldehyde condensation product, the process which comprises forming a mixture of about 100 parts by weight of lignin, 40–150 parts of a phenol selected from the group consisting of phenol and cresol, water, and an acid as a catalyst in amount to establish the pH of the mixture at about 0.1–5, heating the mixture until the lignin forms a water soluble compound with the phenol, then introducing an aldehyde selected from the group consisting of formaldehyde and furfural, in proportion corresponding to about 1.5–2.5 moles of the aldehyde for each mole of the phenol used and an additional amount of the aldehyde equal to about 25–45 parts by weight for each 100 parts of the lignin, and an alkali metal alkali in amount to neutralize the said acid and raise the pH of the resulting mixture to approximately 10–14, and heating the resulting alkalized mixture until a final condensate results that is soluble in the said alkalized mixture but insoluble in water at a pH of 7.

2. The process of claim 1 the said phenol being of the formula $C_6H_5OH$, the aldehyde being formaldehyde and the alkali being sodium hydroxide.

3. The process of claim 2, which comprises adding additional sodium hydroxide to the said final condensate and continuing the heating until the viscosity of the mixture, as measured at 20° C., corresponds to about 200–1,000 cps. for an aqueous solution of solids content approximately 48%.

4. The process of claim 2, the lignin used being thermosetting and being the acidified-aqueous-acetone extracted lignin of wood.

5. The process of claim 2, the lignin used being thermosetting, being the acidified-aqueous-acetone extracted lignin of wood, and being in substantially wax free condition.

6. An adhesive solution comprising the alkali catalyzed, alkali soluble, and water insoluble condensation product of about 35–70 parts of formaldehyde on the anhydrous basis with the acid catalyzed condensation product of about 100 parts of lignin and 40–150 parts of phenol, water, and an alkali metal alkali in amount to cause solution of said water insoluble condensation product, said solution being the product of the process of claim 1.

7. A glue suitable for use in bonding wood veneers in making plywood, the adhesive comprising an aqueous alkali solution of the said final condensate of claim 1 and admixed thereinto an inert powdered filler in the proportion of about 25–200 parts and water in amount to make the total water content about 300–1,000 parts for 100 of the lignin used.

8. The glue of claim 7 including an admixed thickener in the proportion of about 0.03–1.5 parts for 100 parts of lignin in the said glue.

References Cited by the Examiner

UNITED STATES PATENTS

| | | | |
|---|---|---|---|
| 812,608 | 2/1906 | Stephan | 260—57 |
| 2,282,518 | 5/1942 | Hochwalt et al. | 260—17.5 |
| 2,794,790 | 6/1957 | Marshall et al. | 260—17.5 |

OTHER REFERENCES

Brauns: The Chemistry of Lignin, 1952, Academic Press Inc., New York, p. 587.

Delmonte: The Technology of Adhesives, 1947, Rheinhold Publishing Corp., New York, pp. 126, 247, 291.

WILLIAM H. SHORT, *Primary Examiner.*

ALFONSO D. SULLIVAN, MILTON STERMAN,
*Examiners.*